US012613902B1

(12) United States Patent
Cao et al.

(10) Patent No.: US 12,613,902 B1
(45) Date of Patent: Apr. 28, 2026

(54) METHOD FOR CREATING PROMPT

(71) Applicant: FPT USA CORP., Richardson, TX (US)

(72) Inventors: Hung Quoc Cao, Quy Nhon City (VN); Long Tran-Thanh, Quy Nhon City (VN)

(73) Assignee: FPT USA CORP.

( * ) Notice: Subject to any disclaimer, the term of this patent is extended or adjusted under 35 U.S.C. 154(b) by 0 days.

(21) Appl. No.: 19/001,942

(22) Filed: Dec. 26, 2024

(51) Int. Cl.
    *G06F 16/353* (2025.01)
    *G06F 16/583* (2019.01)
    *G06T 11/00* (2006.01)

(52) U.S. Cl.
    CPC ........ *G06F 16/353* (2019.01); *G06F 16/5854* (2019.01); *G06T 11/00* (2013.01)

(58) Field of Classification Search
    CPC ..... G06F 16/353; G06F 16/5854; G06T 11/00
    See application file for complete search history.

(56) References Cited

U.S. PATENT DOCUMENTS

| | | | |
|---|---|---|---|
| 11,886,826 B1 * | 1/2024 | Bavarian | G06F 40/253 |
| 11,983,488 B1 * | 5/2024 | Puri | G06F 40/30 |
| 12,039,431 B1 * | 7/2024 | Deutsch | G06N 3/045 |
| 2024/0295953 A1 * | 9/2024 | Zakharov | G06V 10/82 |
| 2025/0208935 A1 * | 6/2025 | Korganyan | G06F 9/544 |
| 2025/0245872 A1 * | 7/2025 | Cokely | G06F 16/58 |
| 2025/0315471 A1 * | 10/2025 | Dar | G06F 16/51 |

FOREIGN PATENT DOCUMENTS

| | | |
|---|---|---|
| CN | 118171641 A | 6/2024 |
| KR | 20240000942 A | 1/2024 |

* cited by examiner

*Primary Examiner* — Jared M Bibbee

(74) *Attorney, Agent, or Firm* — AEON Law, PLLC; Adam L.K. Philipp; Charlotte E. Holoubek

(57) ABSTRACT

The present disclosure relates to a method for creating a prompt, the method may include: receiving properties of a prompt; clustering the received properties into syntax elements; diversifying, by a large language model (LLM), each of the clustered properties into a plurality of properties; creating a prompt format database; selecting a list of prompt formats in the created prompt format database; and creating prompts by inserting each of the diversified properties, obtained from the diversifying of each of the clustered properties, into each prompt format in the list of prompt formats in accordance with the syntax element of the corresponding clustered property of the diversified properties. The present disclosure also relates to an apparatus for creating a prompt, and a computer program.

11 Claims, 7 Drawing Sheets

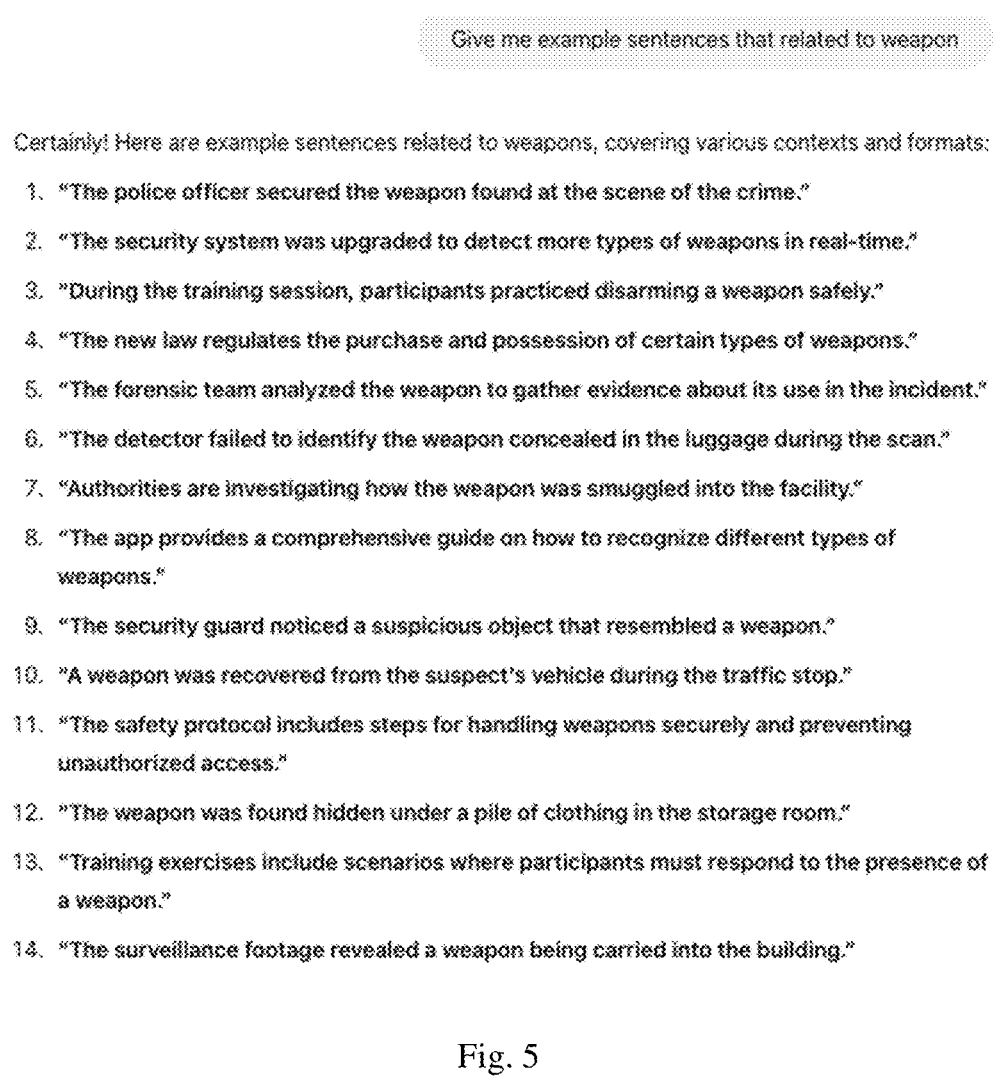

Give me example sentences that related to weapon

Certainly! Here are example sentences related to weapons, covering various contexts and formats:

1. "The police officer secured the weapon found at the scene of the crime."

2. "The security system was upgraded to detect more types of weapons in real-time."

3. "During the training session, participants practiced disarming a weapon safely."

4. "The new law regulates the purchase and possession of certain types of weapons."

5. "The forensic team analyzed the weapon to gather evidence about its use in the incident."

6. "The detector failed to identify the weapon concealed in the luggage during the scan."

7. "Authorities are investigating how the weapon was smuggled into the facility."

8. "The app provides a comprehensive guide on how to recognize different types of weapons."

9. "The security guard noticed a suspicious object that resembled a weapon."

10. "A weapon was recovered from the suspect's vehicle during the traffic stop."

11. "The safety protocol includes steps for handling weapons securely and preventing unauthorized access."

12. "The weapon was found hidden under a pile of clothing in the storage room."

13. "Training exercises include scenarios where participants must respond to the presence of a weapon."

14. "The surveillance footage revealed a weapon being carried into the building."

Fig. 5

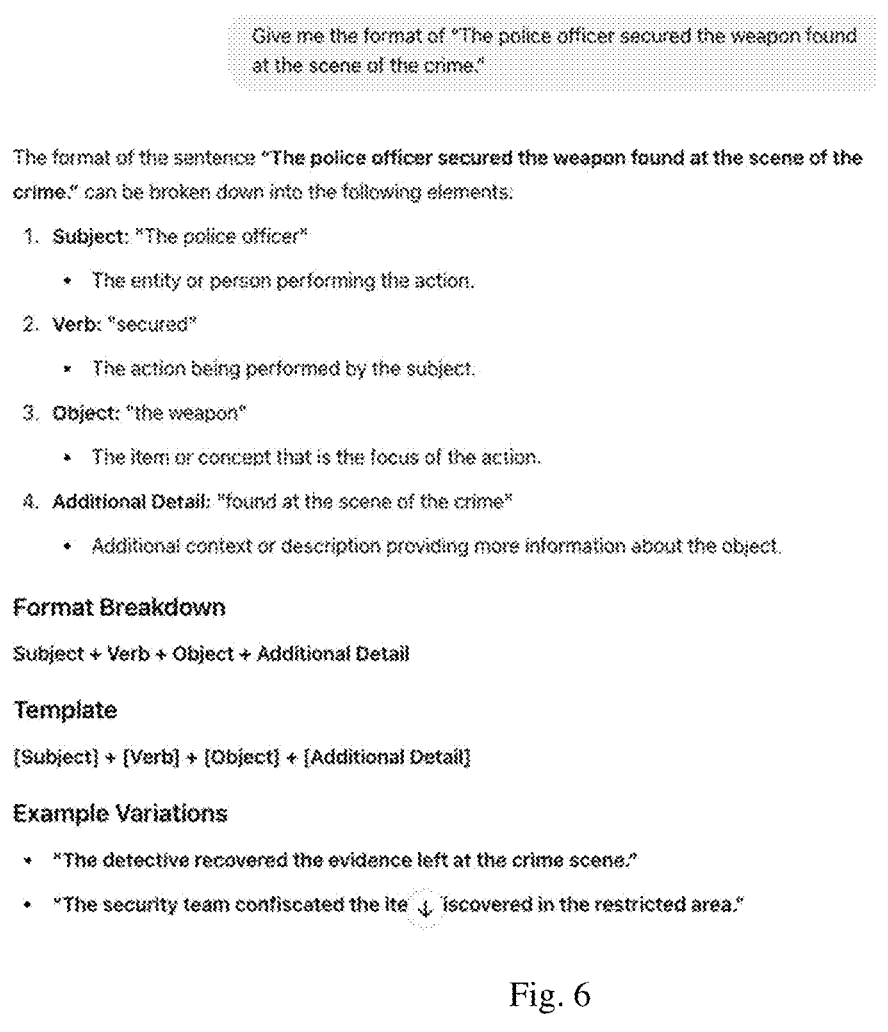

Give me the format of "The police officer secured the weapon found at the scene of the crime."

The format of the sentence "The police officer secured the weapon found at the scene of the crime." can be broken down into the following elements:

1. Subject: "The police officer"

- The entity or person performing the action.

2. Verb: "secured"

- The action being performed by the subject.

3. Object: "the weapon"

- The item or concept that is the focus of the action.

4. Additional Detail: "found at the scene of the crime"

- Additional context or description providing more information about the object.

Format Breakdown

Subject + Verb + Object + Additional Detail

Template

{Subject} + {Verb} + {Object} + {Additional Detail}

Example Variations

- "The detective recovered the evidence left at the crime scene."

- "The security team confiscated the ite  discovered in the restricted area."

Fig. 6

METHOD FOR CREATING PROMPT

CROSS-REFERENCE TO RELATED APPLICATIONS

Not Applicable

TECHNICAL FIELD

The present disclosure relates to a method and an apparatus for creating a prompt, and a computer program.

BACKGROUND OF THE INVENTION

Artificial Intelligence (AI) is a scientific field that is related to building computers as well as machines that can learn, reason and act in such a way that would normally require the intelligence of humans, or that includes data of which the scale goes beyond what humans can analyze. AI is an ability of a machine to replicate or enhance human intelligence, such as learning and reasoning from experiences. AI has been used in computer programs for many years, and is now applied to a variety of other products and services. For example, a user can interact with AI software via prompts to create an image, and some digital cameras with AI software can determine what objects are present in an image.

Currently, there is a need for creating a database of images to train AI to perform a specific objective, and more particularly, there is a need for creating a database of prompts in a form of text to thereby create a database of images to train AI to perform a specific objective. Typically, to this end, a database of prompts is manually created by a user or randomly created by AI or created by adding words or phrases to an existing prompt, which results in that the number of created prompts is limited, the created prompts are not sufficiently diversified and some of the created prompts are not related to the specific objective to train AI.

There is still a need for a method and an apparatus for creating a prompt which overcomes some or all of the above-mentioned limitations.

SUMMARY OF THE INVENTION

One or more aspects of the present disclosure provide a method and an apparatus for creating a prompt, and a computer program.

It should be noted that aspects and objects of the present disclosure should not be limited to the above-described aspects and objects, and other aspects and objects of the present disclosure will be apparent to those skilled in the art from the present disclosure.

According to a first aspect, the present disclosure provides a method for creating a prompt, the method may include:
 receiving properties of a prompt;
 clustering the received properties into syntax elements;
 diversifying, by a large language model (LLM), each of the clustered properties into a plurality of properties;
 creating a prompt format database, wherein the creating of the prompt format database may comprise:
  creating prompt formats,
  evaluating the created prompt formats, wherein the evaluating of the created prompt formats may comprise:
   creating a set of sample prompts for each of the created prompt formats, evaluating the set of sample prompts for the created prompt formats on a correlation to a specific objective of the method, and
   evaluating, by a user and/or the LLM, each of the created prompt formats based on the evaluation results obtained from the evaluating of the set of sample prompts, and
  creating a prompt format database from the created prompt formats of which the evaluation result obtained from the evaluating of each of the created prompt formats is higher than a predefined evaluation threshold;
 selecting a list of prompt formats in the created prompt format database; and
 creating prompts by inserting each of the diversified properties, obtained from the diversifying of each of the clustered properties, into each prompt format in the list of prompt formats in accordance with the syntax element of the corresponding clustered property of the diversified properties.

In a possible implementation, in the receiving of the properties of the prompt, the properties may be predefined properties, and/or inputted in a natural language by a user, and/or generated by a large language model (LLM) via predefined prompts.

In a possible implementation, the syntax elements in the clustering may comprise a subject, a verb, and/or one or more other syntax elements.

In a possible implementation, before the creating of the prompt formats, the method may further include:
 creating possible prompt properties:
  from a natural language inputted by the user in accordance with a specific objective of the method, and/or
  from prompts which are generated by the LLM in accordance with the specific objective, and/or
  from properties which are generated by the LLM in accordance with the specific objective.

In a possible implementation, the creating of the prompt formats may comprise creating prompt formats:
 from the created possible prompt properties, and/or
 from prompts which are generated by the LLM in accordance with the specific objective, and/or
 from prompt formats generated by the LLM in accordance with the specific objective.

In a possible implementation, the creating of the set of sample prompts may comprise:
 generating prompts by the LLM in accordance with the specific objective,
 classifying the generated prompts into each of the created prompt formats obtained from the creating of the prompt formats,
 diversifying properties in each of the classified prompts to create a set of sample prompts for the corresponding prompt format.

In a possible implementation, the evaluating of the set of sample prompts may comprise:
 creating, by an image search engine and a text-to-image model, a set of images by using each sample prompt in the set of sample prompts of each of the created prompt formats,
 evaluating by comparing the sets of images of the created prompt formats of which sample prompts have the same properties for each of the common syntax elements based on the correlation to the specific objective, and
 evaluating all images in the sets of images, which are created from sample prompts having the same properties for each of the common syntax elements, based on the correlation to the specific objective, wherein the evaluating of each of the created prompt formats may comprise evaluating each of the created prompt formats based on a combination of the evaluation results obtained from the evaluating by comparing the sets of images and the evaluating of all images; and wherein, in the creating of the prompt format database, the predefined evaluation threshold may be a predefined evaluation threshold or set by the user.

In a possible implementation, the creating of the prompts may further comprise:

if one of the diversified properties is syntax-clustered as the subject and the relevance of the said property to the specific objective is higher than a predefined threshold, then inserting the said property and other diversified properties into each prompt format in the list with the verb and/or one or more of the other syntax elements removed.

In a possible implementation, the diversifying of each of the clustered properties may comprise diversifying each of the clustered properties in accordance with the specific objective, wherein the specific objective may be a weapon detection, and/or a specific object detection.

In a possible implementation, the selecting of the list of prompt formats may comprise:

adding all prompt formats in the prompt format database obtained from the creating of the prompt format database to the list, and removing duplicates of each prompt format from the list of prompt formats.

In a possible implementation, after the diversifying of each of the clustered properties into the plurality of properties, the method may further include filtering the diversified properties of one of the clustered properties based on a relevance of the diversified properties to each of the other clustered properties, the relevance may be determined by the LLM;

wherein the creating of the prompts may comprise:

creating prompts by inserting each of the filtered diversified properties obtained from the filtering of the diversified properties into each prompt format in the list of prompt formats in accordance with the syntax element of the corresponding clustered property of the filtered diversified properties, and if one of the filtered diversified properties is syntax-clustered as the subject and the relevance of the said property to the specific objective is higher than a predefined threshold, then inserting the said property and other filtered diversified properties into each prompt format in the list with the verb and/or one or more of the other syntax elements removed.

According to a second aspect, the present disclosure provides an apparatus for creating a prompt, the apparatus may include:

a receiving unit configured for receiving properties of a prompt;

a clustering unit configured for clustering the received properties into syntax elements;

a diversifying unit configured for diversifying, by a large language model (LLM), each of the clustered properties into a plurality of properties;

a creating unit configured for creating a prompt format database, wherein the creating of the prompt format database may comprise:

creating prompt formats, evaluating the created prompt formats, wherein the evaluating of the created prompt formats may comprise:

creating a set of sample prompts for each of the created prompt formats, evaluating the set of sample prompts for the created prompt formats on a correlation to a specific objective of the method, and evaluating, by a user and/or the LLM, each of the created prompt formats based on the evaluation results obtained from the evaluating of the set of sample prompts, and creating a prompt format database from the created prompt formats of which the evaluation result obtained from the evaluating of each of the created prompt formats is higher than a predefined evaluation threshold;

a selecting unit configured for selecting a list of prompt formats in the created prompt format database; and a creating unit configured for creating prompts by inserting each of the diversified properties, obtained from the diversifying of each of the clustered properties, into each prompt format in the list of prompt formats in accordance with the syntax element of the corresponding clustered property of the diversified properties.

In a possible implementation, the receiving unit may be further configured so that, in the receiving of the properties of the prompt, the properties are predefined properties, and/or inputted in a natural language by a user, and/or generated by a large language model (LLM) via predefined prompts.

In a possible implementation, the syntax elements in the clustering may comprise a subject, a verb, and/or one or more other syntax elements.

In a possible implementation, the creating unit may be further configured so that, before the creating of the prompt formats, the creating unit creates possible prompt properties:

from a natural language inputted by the user in accordance with a specific objective of the apparatus, and/or from prompts which are generated by the LLM in accordance with the specific objective, and/or from properties which are generated by the LLM in accordance with the specific objective.

In a possible implementation, the creating unit may be further configured so that the creating of the prompt formats comprises creating prompt formats:

from the created possible prompt properties, and/or from prompts which are generated by the LLM in accordance with the specific objective, and/or from prompt formats generated by the LLM in accordance with the specific objective.

In a possible implementation, the creating unit may be further configured so that the creating of the set of sample prompts comprises:

generating prompts by the LLM in accordance with the specific objective, classifying the generated prompts into each of the created prompt formats obtained from the creating of the prompt formats, diversifying properties in each of the classified prompts to create a set of sample prompts for the corresponding prompt format.

In a possible implementation, the creating unit may be further configured so that the evaluating of the set of sample prompts comprises:

creating, by an image search engine and a text-to-image model, a set of images by using each sample prompt in the set of sample prompts of each of the created prompt formats, evaluating by comparing the sets of images of the created prompt formats of which sample prompts have the same properties for each of the common syntax elements based on the correlation to the specific objective, and evaluating all images in the sets of images, which are created from sample prompts having the same properties for each of the common syntax elements, based on the correlation to the specific objective, wherein the evaluating of each of the created prompt formats may comprise evaluating each of the created prompt formats based on a combination of the evaluation results obtained from the evaluating by comparing the sets of images and the evaluating of all images; and wherein, in the creating of the prompt format database, the predefined evaluation threshold may be a predefined evaluation threshold or set by the user.

In a possible implementation, the creating unit may be further configured so that the creating of the prompts further comprises:

if one of the diversified properties is syntax-clustered as the subject and the relevance of the said property to the specific objective is higher than a predefined threshold, then inserting the said property and other diversified properties into each prompt format in the list with the verb and/or one or more of the other syntax elements removed.

In a possible implementation, the diversifying unit may be further configured so that the diversifying of each of the clustered properties comprises diversifying each of the clustered properties in accordance with the specific objective, wherein the specific objective may be a weapon detection, and/or a specific object detection.

In a possible implementation, the selecting unit may be further configured so that the selecting of the list of prompt formats comprises:

adding all prompt formats in the prompt format database obtained from the creating of the prompt format database to the list, and removing duplicates of each prompt format from the list of prompt formats.

In a possible implementation, the diversifying unit may be further configured so that, after the diversifying of each of the clustered properties into the plurality of properties, the diversifying unit filters the diversified properties of one of the clustered properties based on a relevance of the diversified properties to each of the other clustered properties, the relevance is determined by the LLM;

wherein the creating unit may be further configured so that the creating of the prompts comprises:

creating prompts by inserting each of the filtered diversified properties obtained from the filtering of the diversified properties into each prompt format in the list of prompt formats in accordance with the syntax element of the corresponding clustered property of the filtered diversified properties, and if one of the filtered diversified properties is syntax-clustered as the subject and the relevance of the said property to the specific objective is higher than a predefined threshold, then inserting the said property and other filtered diversified properties into each prompt format in the list with the verb and/or one or more of the other syntax elements removed.

According to a third aspect, the present disclosure provides a computer program, the computer program comprises instructions which, upon being executed by a computing device having one or more processors, cause the one or more processors to perform the method in any of or any combination of possible implementations in the first aspect of the present disclosure.

According to a fourth aspect, the present disclosure provides a computer-readable storage medium, the computer-readable storage medium stores a computer program, the computer program comprises instructions, upon being executed by a computing device having one or more processors, cause the one or more processors to perform the method in any of or any combination of possible implementations in the first aspect of the present disclosure.

According to the present disclosure, the method and apparatus for creating a prompt can overcome some or all of the above-mentioned limitations, for example, but not limited to, the prompts are automatically created so that the number of created prompts is higher than a case in which the prompts are manually created by a user, the created prompts are sufficiently diversified based on syntax elements thereof, and the created prompts are related to the specific objective to train AI.

The foregoing specific objective of the method and apparatus may be a weapon detection, and/or a specific object detection, however, the specific objective should not be limited thereto. The specific objective of the method and apparatus may be any objective, for example, but not limited to, an object detection such as a weapon detection, and/or any other specific object detection.

The effects of the present disclosure should not be limited to the above-mentioned effects, and other effects that are not mentioned in the present disclosure will be apparently understood by those skilled in the art from the description and the appended claims.

BRIEF DESCRIPTION OF DRAWINGS

The accompanying drawings are included to provide a further understanding of the present disclosure, incorporated in, and constitute a part of the specification. The accompanying drawings illustrate embodiments of the present disclosure and, together with the description, explain the principles of the present disclosure.

In the drawings:

FIG. 5 is a drawing showing an example of prompts which are generated by the LLM in accordance with the specific objective, according to the present disclosure.

FIG. 6 is a drawing showing an example of prompt formats which are created from one of the prompts which are generated by the LLM in accordance with the specific objective, according to the present disclosure.

DETAILED DESCRIPTION OF THE INVENTION

Figure 1:
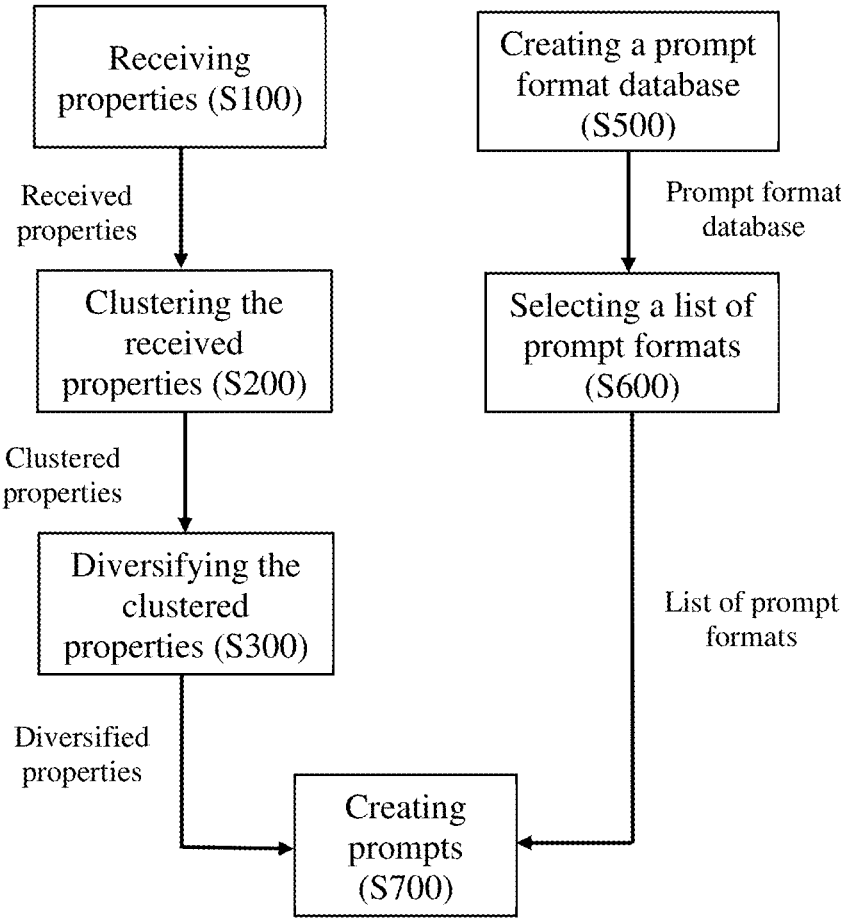
FIG. 1 is a schematic diagram illustrating a method for creating a prompt according to an embodiment of the present disclosure.

Advantages and characteristics of the present disclosure and a method of achieving the same will be made to be clear by referring to exemplary embodiments described in detail below together with the accompanying drawings. However, the present disclosure is not limited to the exemplary embodiments disclosed herein but may be implemented in various forms. The exemplary embodiments are provided by way of example only so that a person skilled in the art can fully understand the present disclosure.

The features of various embodiments of the present disclosure can be partially or entirely combined with each other and can be operated in various ways, and the embodiments can be carried out independently of or in association with one another.

The order of steps or order for performing certain actions is immaterial as long as the present disclosure remains operable. That is, a certain step may occur in an order different from that described herein, or concurrently with another step.

When the terms such as "after," "subsequent to," "next to," "before," and the like, are used for describing a temporal relationship, cases where any two events are not consecutive or not sequential may be included, unless the term "immediately" or "directly" is explicitly used. That is, one or more other events may occur between those two events, unless a more limiting term such as "just," "immediate(ly)," or "direct(ly)" is used.

The terms such as "comprising," "including," "having," and "consist of" used herein are generally intended to allow other components to be added unless the terms are used with the term "only."

Unless otherwise defined, terms used herein (including technical and scientific terms) have common meanings that would normally be interpreted by a person skilled in the art. Further, terms such as those defined in commonly used dictionaries should be interpreted as having a meaning consistent with their meaning in relevant art and should not be interpreted in an idealized or overly formal sense, unless expressly defined otherwise.

Although the terms "first," "second," and the like are used for describing various components, these components are not confined by these terms. These terms are merely used for distinguishing one component from the other components. Therefore, a first component to be mentioned below may be a second component in a technical concept of the present disclosure.

Any references to singular may include plural unless expressly stated otherwise. And "a plurality of" means two or more. Further, the phrase "at least one" should be understood as including any and all combinations of one or more of listed items. For example, each of the phrases "at least one of a first item, a second item, or a third item" and "at least one of a first item, a second item, and a third item" may represent a combination of two or more of the first item, the second item, and the third item, or may represent only one of the first item, the second item, or the third item.

Like reference numerals generally denote like elements throughout the specification.

In the following description of the present disclosure, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists.

In the following description of the present disclosure, a detailed explanation of known related technologies may be omitted to avoid unnecessarily obscuring the subject-matters of the present disclosure.

The present disclosure will now be described with reference to the accompany drawings.

FIG. 1 is a schematic diagram illustrating a method for creating a prompt according to an embodiment of the present disclosure.

As shown in FIG. 1, the method for creating the prompt of this embodiment may include the following steps:

receiving properties of a prompt (Step S100);

clustering the received properties into syntax elements (Step S200);

diversifying, by a large language model (LLM), each of the clustered properties into a plurality of properties (Step S300);

creating a prompt format database (Step S500), wherein the creating of the prompt format database may comprise the following steps:

creating prompt formats (Step S520), evaluating the created prompt formats (Step S530), wherein the evaluating of the created prompt formats may comprise the following steps:

creating a set of sample prompts for each of the created prompt formats (Step S531), evaluating the set of sample prompts for the created prompt formats on a correlation to a specific objective of the method (Step S532), and evaluating, by a user and/or the LLM, each of the created prompt formats based on the evaluation results obtained from the step of S532 for evaluating the set of sample prompts (Step S533), and creating a prompt format database from the created prompt formats of which the evaluation result obtained from the step of S533 for evaluating each of the created prompt formats is higher than a predefined evaluation threshold (Step S540);

selecting a list of prompt formats in the created prompt format database (Step S600); and creating prompts by inserting each of the diversified properties, obtained from the step of S300 for diversifying each of the clustered properties, into each prompt format in the list of prompt formats in accordance with the syntax element of the corresponding clustered property of the diversified properties (Step S700).

The large language model (LLM) may be any of existing large language models or large language models which will be developed in future. The large language model (LLM) may be, for example, but not limited to, ChatGPT, Gemini, Copilot, or llama.

In a possible implementation, in the step of S100 for receiving the properties of the prompt, the properties may be predefined properties, and/or inputted in a natural language by a user, and/or generated by the LLM via predefined prompts.

When the properties are predefined properties, the predefined properties may be predefined by the user and/or the LLM. The predefined properties may be default properties, for example, default properties of a subject are "man" and/or "children," or default properties of an object are "gun" and/or "sword." The predefined properties may be suggested to the user, for example via a user interface, during the step of S100 for receiving the properties of the prompt.

When the properties are generated by the LLM via predefined prompts, the predefined prompts may be, for example, a prompt of "What properties should be included in a prompt for AI to detect weapon?" in case the specific objective of the method is a weapon detection.

Optionally, after the step of S100 for receiving the properties, the user may modify the received properties, comprising changing, adding and/or removing one or more properties in/to/from the received properties.

In a possible implementation, the syntax elements in the step of S200 for clustering the received properties may comprise a subject, a verb, and/or one or more other syntax elements.

Properties of a subject may be, for example, but not limited to, people. Properties of a verb may be, for example, but not limited to, an action and/or an activity. One or more other syntax elements may be, for example, but not limited to, a place, an environment, a time of the day, an image capturing device which captures the image, and/or a weapon in case the specific objective of the method is a weapon detection.

In a possible implementation, before the step of S520 for creating the prompt formats, the method may further include a step of S510 for creating possible prompt properties:

from a natural language inputted by the user in accordance with the specific objective of the method, and/or from prompts which are generated by the LLM in accordance with the specific objective, and/or from properties which are generated by the LLM in accordance with the specific objective.

In a possible implementation, the step of S520 for creating the prompt formats may comprise creating prompt formats:

from the created possible prompt properties, and/or from prompts which are generated by the LLM in accordance with the specific objective, and/or from prompt formats generated by the LLM in accordance with the specific objective.

FIG. 5 is a drawing showing an example of prompts which are generated by the LLM in accordance with the specific objective, according to the present disclosure. FIG. 6 is a drawing showing an example of prompt formats are created from one of the prompts which are generated by the LLM in accordance with the specific objective, according to the present disclosure.

Referring to FIG. 5 and FIG. 6, when the prompt formats are created from prompts which are generated by the LLM in accordance with the specific objective, prompts are first generated by the LLM via a prompt of, for example, "Give me example sentences that related to weapon," which is for the specific objective of the weapon detection, prompt formats then are created, by the LLM, from the prompts generated by the LLM via prompts in the form of, for example, "Give me the format of [prompt]."

After the step of S520 for creating the prompt formats, a plurality of prompt formats may be created. These prompt formats may be evaluated, for example based on the correlation to the specific objective, to be added to the prompt format database.

In a possible implementation, the step of S531 for creating the set of sample prompts may comprise the following steps:

generating prompts by the LLM in accordance with the specific objective (Step S5311), classifying the generated prompts into each of the created prompt formats obtained from the step of S520 for creating the prompt formats (Step S5312), diversifying properties in each of the classified prompts to create a set of sample prompts for the corresponding prompt format (Step S5313).

In a possible implementation, the step of S532 for evaluating the set of sample prompts may comprise the following steps:

creating, by an image search engine and a text-to-image model, a set of images by using each sample prompt in the set of sample prompts of each of the created prompt formats (Step S5321), evaluating by comparing the sets of images of the created prompt formats of which sample prompts have the same properties for each of the common syntax elements based on the correlation to the specific objective (Step S5322), and evaluating all images in the sets of images, which are created from sample prompts having the same properties for each of the common syntax elements, based on the correlation to the specific objective (Step S5323).

The image search engine may be, for example, but not limited to, Google Image, Bing Image Search, Baidu Image Search, or Yandex Images. The text-to-image model may be, for example, but not limited to, a generative AI model which is capable to generate data, for example, such as DALL-E (Open AI), Stable Diffusion, Imagen, or Runway ML.

The step of S533 for evaluating each of the created prompt formats may comprise evaluating each of the created prompt formats based on a combination of the evaluation results obtained from the step of S5322 for evaluating the sets of images by comparing the sets of images and the step of S5323 for evaluating all images.

In the step of S540 for creating the prompt format database, the predefined evaluation threshold may be a predefined evaluation threshold or set by the user.

The above-mentioned evaluation is for evaluating prompt formats; therefore, the prompt formats are evaluated based on images which are created from sample prompts having the same properties for each of the common syntax elements.

As a non-limiting example for the above-mentioned evaluation, there are sample prompts formed from the same set of properties, that is, {two men, hold, knife, park, captured by camera}, and two prompt formats to be evaluated, that is, Format 1 of "Subject+Verb+Weapon" and Format 2 of "Subject+Verb+Weapon+Place+Image Capturing Device." In this example, the sample prompts are "Two men hold a knife" and "Two men hold a knife in a park captured by camera." Two images are created by an image search engine and two images are created a text-to-image model, by using the sample prompt of "Two men hold a knife" of Format 1, to obtain a first set of four images. Two images are created by an image search engine and two images are created a text-to-image model, by using the sample prompt of "Two men hold a knife in a park captured by camera" of Format 2, to obtain a second set of four images.

In this non-limiting example, in the step of S5322, the first and second sets of images are evaluated, by the user and/or the LLM, by comparing the first set of images to the second set of images based on the correlation to the specific objective. For example, the user and/or the LLM evaluate the second set of images of Format 2 is better than the first set of images of Format 1, based on the correlation to the specific objective, an evaluation result of the second set of images of Format 2 is 90% and an evaluation result of the first set of images of Format 1 is 10%.

In this non-limiting example, in the step of S5323, all images in the first and second sets of images are evaluated, by the user and/or the LLM, based on the correlation to the specific objective. All images in the first and second sets of images may be scrambled or mixed before the evaluation. For example, the user and/or the LLM evaluate that two images in the first set of images of Format 1 and all of four images in the second set of images of Format 2 correlate to the specific objective, accordingly, an evaluation result of the first set of images of Format 1 is 50% and an evaluation result of the second set of images of Format 2 is 100%.

In this non-limiting example, in the step of S533, each of the created prompt formats is evaluated based on a combination of the evaluation results obtained from the step of S5322 and the step of S5323. For example, the evaluation results of Format 1 from the step of S5322 and the step of S5323 are 10% and 50%, respectively, and a combination of the evaluation results of Format 1 may be an arithmetic mean of these evaluation results, that is, 30%; while the evaluation results of Format 2 from the step of S5322 and the step of S5323 are 90% and 100%, respectively, and a combination of the evaluation results of Format 2 may be an arithmetic mean of these evaluation results, that is, 95%.

According to the present disclosure, the user may be any user, for example, but not limited to, a user and/or a AI engineer who are aware of the specific objective of the method.

In this non-limiting example, in the step of S540, the prompt format database is created from the created prompt formats of which the evaluation result obtained from the step of S533 is higher than a predefined evaluation threshold. The predefined evaluation threshold may be a predefined evaluation threshold or set by the user. The predefined evaluation threshold may be 50%. In this non-limiting example, when predefined evaluation threshold is 50%, the evaluation result of Format 1 obtained from the step of S533 is 30%, which is less than the evaluation threshold of 50%, Format 1 is not added to the prompt format database, while the evaluation result of Format 2 obtained from the step of S533 is 95%, which is higher than the evaluation threshold of 50%, Format 2 is added to the prompt format database.

In a possible implementation, the step of S700 for creating the prompts may further comprise the following step.

If one of the diversified properties is syntax-clustered as the subject and the relevance of the said property to the specific objective is higher than a predefined threshold, then inserting the said property and other diversified properties into each prompt format in the list with the verb and/or one or more of the other syntax elements removed.

In the step of S700, in addition to prompts are created by inserting each of the diversified properties, obtained from the step of S300 for diversifying each of the clustered properties, into each prompt format in the list of prompt formats in accordance with the syntax element of the corresponding clustered property of the diversified properties, if one of the diversified properties is syntax-clustered as the subject and the relevance of the said property to the specific objective is higher than a predefined threshold, then additional prompts may be created by inserting the said property and other diversified properties into each prompt format in the list with the verb and/or one or more of the other syntax elements removed. In other words, if one of the diversified properties is syntax-clustered as the subject and the relevance of the said property to the specific objective is higher than a predefined threshold, then additional prompt formats may be created by removing the verb and/or one or more of the other syntax elements from existing prompt formats in the list of prompt formats, and the additional prompts may be created by inserting the said property and other diversified properties into each of the additional prompt formats.

As a non-limiting example, the specific objective of the method is a weapon detection and the specific object to be detected is a weapon, "a robber" and "two men" is two of the diversified properties which are diversified from a property of "people" which is syntax-clustered as the subject, the relevance of "a robber" and "two men" to the weapon detection may be determined by the LLM, for example, by using prompts of "How many percentage is a robber related to a weapon?" and "How many percentage are two men related to a weapon?", respectively. From results of the prompts, if the LLM determines that the percentage of "a robber" related to a weapon detection is higher than or equal to a predefined threshold, then additional prompts are created by inserting "a robber" and other diversified properties into each prompt format in the list with the verb and/or one or more of the other syntax elements removed (for example, in case "Subject+Verb+Weapon+Place" is one prompt format in the list, additional prompts are created by inserting "a robber" and other diversified properties into additional prompt formats of "Subject+Weapon+Place," "Subject+Verb+Place," and "Subject+Place," that is, with the verb and/or one or more of the other syntax elements removed from "Subject+Verb+Weapon+Place"). From results of the prompts, if the LLM determines that the percentage of "two men" related to a weapon detection is less than the predefined threshold, then no additional prompts are created for "two men" (no additional prompt formats are created for "two men").

The predefined threshold may be a predefined threshold or set by the user. The predefined threshold may be, for example, but not limited to 50%.

The removal of the verb and/or one or more of the other syntax elements from the prompt format creates one or more additional prompt formats, which increases the number of prompt formats and thereby increases the diversification of prompts created from the prompt formats, while it still maintains a high relevance between the diversified properties (as well as prompts created therefrom) and the specific objective of the method.

In a possible implementation, the step of S300 for diversifying each of the clustered properties may comprise diversifying each of the clustered properties in accordance with the specific objective.

The specific objective may be, for example, but not limited to, a weapon detection, and/or a specific object detection.

In a possible implementation, the step of S600 for selecting the list of prompt formats may comprise the following steps:

adding all prompt formats in the prompt format database obtained from the step of S500 for creating the prompt format database to the list (Step S610), and removing duplicates of each prompt format from the list of prompt formats (Step S620).

In the step of S700, prompts may be created by inserting each of the diversified properties, obtained from the step of S300 for diversifying each of the clustered properties, into each prompt format in the list of prompt formats in accordance with the syntax element of the corresponding clustered property of the diversified properties. That is, the diversified properties which are diversified from the corresponding clustered property, which is clustered into a syntax element of a subject, may be inserted into each prompt format in the list of prompt formats in accordance with the syntax element of the subject, in other words, these diversified properties may be inserted into each prompt format in the list as the subject. Similarly, the diversified properties which are diversified from the corresponding clustered property, which is clustered into a syntax element of a verb, may be inserted into each prompt format in the list of prompt formats in accordance with the syntax element of the verb, in other words, these diversified properties may be inserted into each prompt format in the list as the verb. Similarly, the diversified properties which are diversified from the corresponding clustered property, which is clustered into one or more other syntax elements, may be inserted into each prompt format in the list of prompt formats in accordance with the one or more other syntax elements, respectively, in other words, these diversified properties may be inserted into each prompt format in the list as the one or more other syntax elements, respectively. The one or more other syntax elements may be, for example, but not limited to, a place, an environment, a time of the day, an image capturing device which captures the image, and/or a weapon in case the specific objective of the method is a weapon detection.

Figure 2:
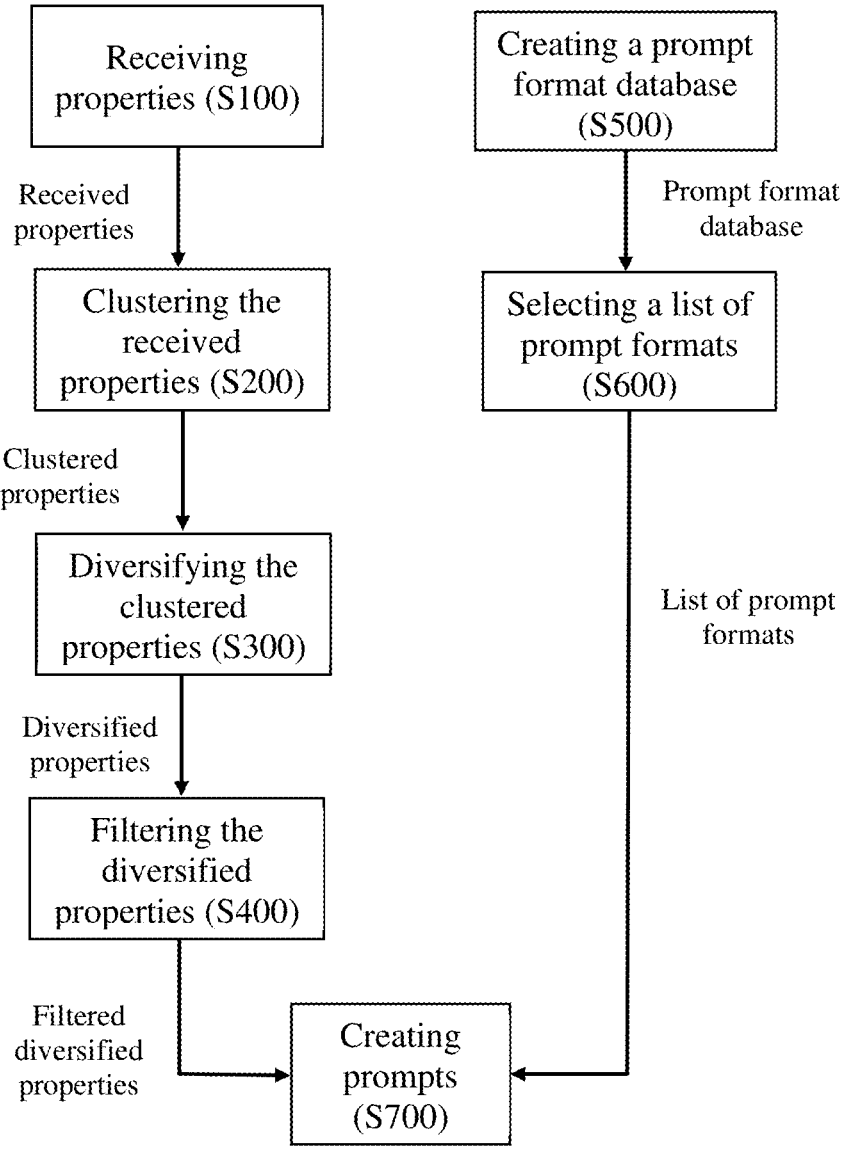
FIG. 2 is a schematic diagram illustrating a method for creating a prompt according to another embodiment of the present disclosure.

FIG. 2 is a schematic diagram illustrating a method for creating a prompt according to another embodiment of the present disclosure.

Referring to FIG. 2, as compared to the method in the foregoing method embodiment in FIG. 1, the method for creating the prompt of this embodiment may further include, after the step of S300 for diversifying each of the clustered properties into the plurality of properties, a step of S400 for filtering the diversified properties of one of the clustered properties based on a relevance of the diversified properties to each of the other clustered properties, the relevance may be determined by the LLM.

After the clustered properties are diversified, if the diversified properties are used to create prompts without filtering (that is, without the step of S400 for filtering), then there may be diversified properties which are not related to each other or not related to the same situation or scenario, which may lead to unrealistic prompts and unrealistic images created from these unrealistic prompts. For example, in case the specific objective of the method is a weapon detection, a situation where "a rifle" appears in "residential areas" is not highly realistic. Such unrelated diversified properties may be filtered out by using the step of S400 for filtering.

In the step of S400, the LLM may determine the relevance between the diversified properties of one of the clustered properties (the one of the clustered properties is clustered into a specific syntax element) and each of the other clustered properties, and the LLM may filter out unrelated diversified properties based on the determined relevance. The syntax elements in the step of S200 for clustering the received properties may comprise a subject, a verb, and/or one or more other syntax elements. As a non-limiting example, clustered properties of a subject may be "people," clustered properties of a verb may be "shoot," and clustered properties of one or more other syntax elements may be "residential areas" as a place and "a weapon" as a weapon in case the specific objective of the method is a weapon detection. In this non-limiting example, "a weapon" may be diversified into "a handgun" and "a rifle," and, in the step of S400, the relevance between "a handgun" and "a rifle" and each of the other clustered properties, such as "residential areas," may be determined by the LLM, for example, by using prompts of "How many percentage is a handgun related to residential areas?" and "How many percentage is a rifle related to residential areas?", respectively. From results of the prompts, if the LLM determines that the percentage of "a handgun" related to residential areas is higher than or equal to a relevance threshold, then "a handgun" is not filtered out; and if the LLM determines that the percentage of "a rifle" related to residential areas is less than the relevance threshold, then "a rifle" is filtered out, that is "a rifle" is removed from the filtered diversified properties. The relevance threshold may be a predefined relevance threshold or set by the user.

After the step of S400 for filtering the diversified properties based on the relevance of the diversified properties to each of the other clustered properties, the relevance among the filtered diversified properties is improved, consequently, prompts created from the filtered diversified properties and images created from these prompts are more realistic.

In the method for creating the prompt in FIG. 2, since the diversified properties are filtered after the step of S300 for diversifying, the step of S700 for creating the prompts may comprise creating prompts by inserting each of the filtered diversified properties obtained from the step of S400 for filtering the diversified properties into each prompt format in the list of prompt formats in accordance with the syntax element of the corresponding clustered property of the filtered diversified properties, and if one of the filtered diversified properties is syntax-clustered as the subject and the relevance of the said property to the specific objective is higher than a predefined threshold, then inserting the said property and other filtered diversified properties into each prompt format in the list with the verb and/or one or more of the other syntax elements removed.

The present disclosure also provides an apparatus for creating a prompt.

Figure 3:
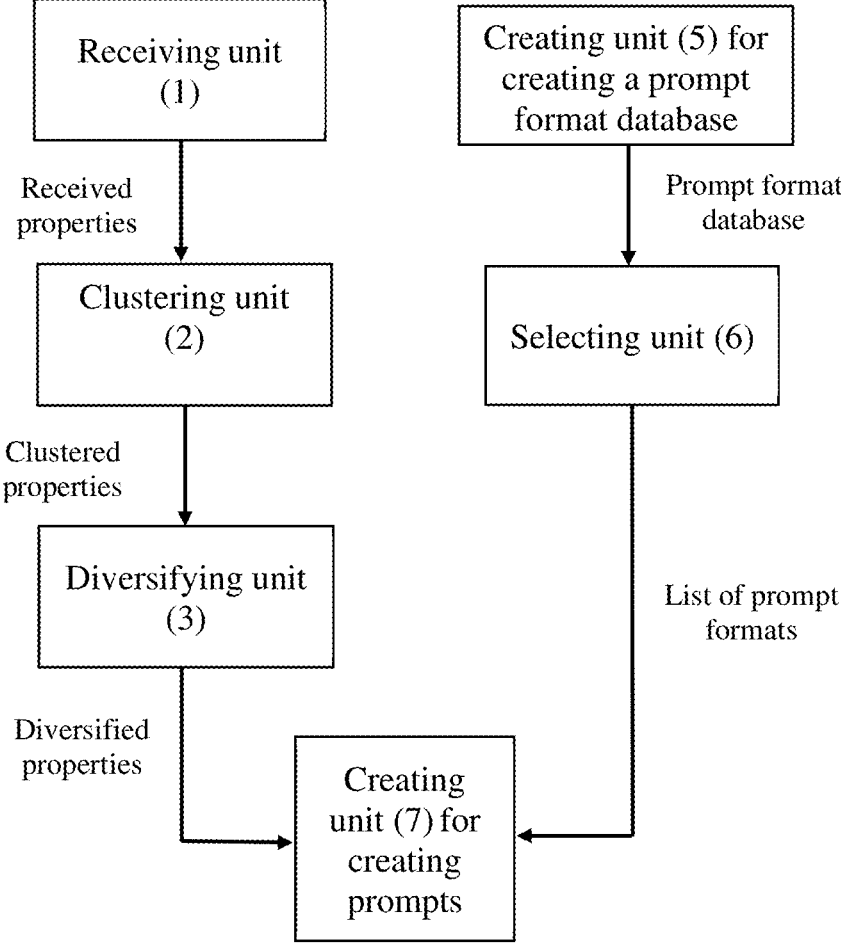
FIG. 3 is a schematic diagram illustrating an apparatus for creating a prompt according to an embodiment of the present disclosure.

FIG. 3 is a schematic diagram illustrating an apparatus for creating a prompt according to an embodiment of the present disclosure.

As shown in FIG. 3, the apparatus for creating the prompt in this embodiment may include a receiving unit 1, a clustering unit 2, a diversifying unit 3, a creating unit 5 for creating a prompt format database, a selecting unit 6, and a creating unit 7 for creating prompts.

The apparatus for creating the prompt in FIG. 3 may be configured to perform the method for creating the prompt in FIG. 1. Particularly, the above-mentioned units of the apparatus for creating the prompt in FIG. 3 may be configured to respectively perform the steps of the method for creating the prompt in FIG. 1. For example, the receiving unit 1 may be configured to perform the step of S100 in FIG. 1, the clustering unit 2 may be configured to perform the step of S200 in FIG. 1, the diversifying unit 3 may be configured to perform the step of S300 in FIG. 1, the creating unit 5 for creating the prompt format database may be configured to perform the step of S500 in FIG. 1, the selecting unit 6 may be configured to perform the step of S600 in FIG. 1, and the creating unit 7 for creating the prompts may be configured to perform the step of S700 in FIG. 1. The steps of the method for creating the prompt in FIG. 1 have already been described above, therefore, repeated descriptions of the configurations of the above-mentioned units of the apparatus in FIG. 3 will be omitted to avoid unnecessarily obscuring the subject-matters of the present disclosure.

Figure 4:
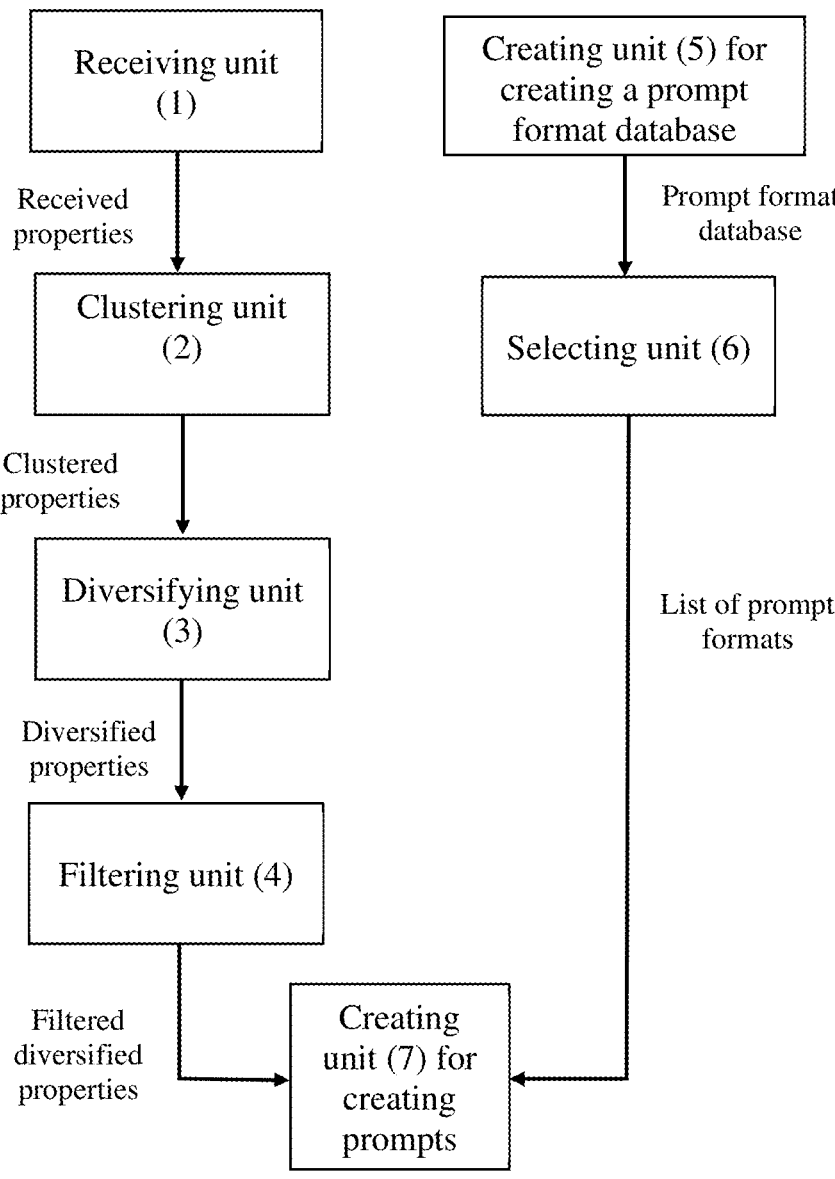
FIG. 4 is a schematic diagram illustrating an apparatus for creating a prompt according to another embodiment of the present disclosure.

FIG. 4 is a schematic diagram illustrating an apparatus for creating a prompt according to another embodiment of the present disclosure.

Referring to FIG. 4, as compared to the apparatus in the foregoing apparatus embodiment in FIG. 3, the apparatus for creating the prompt of this embodiment may further include a filtering unit 4.

The apparatus for creating the prompt in FIG. 4 may be configured to perform the method for creating the prompt in FIG. 2. Particularly, the units of the apparatus for creating the prompt in FIG. 4 may be configured to respectively perform the steps of the method for creating the prompt in FIG. 2. For example, the receiving unit 1 may be configured to perform the step of S100 in FIG. 2, the clustering unit 2 may be configured to perform the step of S200 in FIG. 2, the diversifying unit 3 may be configured to perform the step of S300 in FIG. 2, the creating unit 5 for creating the prompt format database may be configured to perform the step of S500 in FIG. 2, the selecting unit 6 may be configured to perform the step of S600 in FIG. 2, the creating unit 7 for creating the prompts may be configured to perform the step of S700 in FIG. 2, and the filtering unit 4 may be configured to perform the step of S400 in FIG. 2. The steps of the method for creating the prompt in FIG. 2 have already been described above, therefore, repeated descriptions of the configurations of the above-mentioned units of the apparatus in FIG. 4 will be omitted to avoid unnecessarily obscuring the subject-matters of the present disclosure.

The present disclosure also provides a computer program, the computer program comprises instructions which, upon being executed by a computing device having one or more processors, cause the one or more processors to perform the method in any of or any combination of possible implementations in the foregoing method embodiments.

The present disclosure also provides a computer-readable storage medium, the computer-readable storage medium stores a computer program, the computer program comprises instructions which, upon being executed by a computing device having one or more processors, cause the one or more processors to perform the method in any of or any combination of possible implementations in the foregoing method embodiments.

Figure 7:
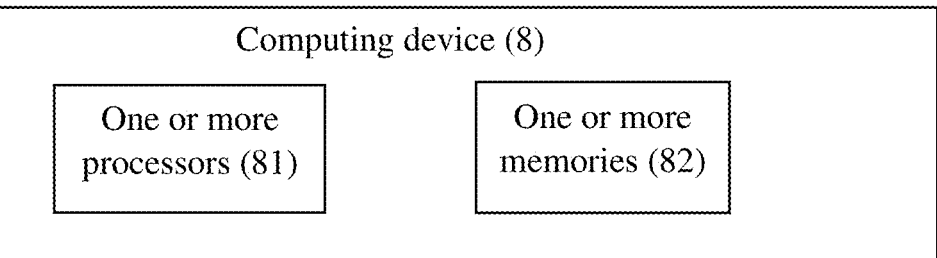
FIG. 7 is a block diagram illustrating an exemplary computer architecture for implementing aspects of the present disclosure, according to some embodiments of the present disclosure.

FIG. 7 is a block diagram illustrating an exemplary computer architecture for implementing aspects of the present disclosure, according to some embodiments of the present disclosure.

Referring to FIG. 7, an exemplary computer architecture may include a computing device 8 (for example, but not limited to, a general-purpose computing device). The computing device 8 may include one or more processors 81, one or more memories 82 and/or any other units. The one or more processors 81 may be, but not limited to, a general-purpose processor, an application-specific integrated circuit (ASIC), or a field-programmable gate array (FPGA). The one or more memories 82 may be, but not limited to, a non-volatile memory such as a hard disk drive (HDD), or a volatile memory such as a random-access memory (RAM). The one or more memories 82 are configured to store instructions and data. The one or more memories 82 are coupled to the one or more processors 81. In embodiments of the present disclosure, a computer program comprises instructions which, upon being executed by the computing device 8, cause the one or more processors 81 to perform the method in any of or any combination of possible implementations in the foregoing method embodiments. In other embodiments of the present disclosure, a computer-readable storage medium stores a computer program, the computer program comprises instructions which, upon being executed by the computing device 8, cause the one or more processors 81 to perform the method in any of or any combination of possible implementations in the foregoing method embodiments.

For the specific objective of the method and apparatus as the weapon detection, if a user manually searches images in the Internet via an image search engine, the number of search results may be limited because images, of which situations and scenarios are related to a weapon, may be restricted or censored in the Internet. According to the foregoing embodiments of the present disclosure, the prompts are automatically created so that the number of created prompts is higher than a case in which the prompts are manually created by a user, the created prompts are sufficiently diversified based on syntax elements thereof, the prompts are created in accordance with the specific objective to train AI, and the images may be searched using a generative AI model which is capable to generate image data in addition to using the image search engine for existing images; as a result, according to the present disclosure, the number of created prompts is increased, the diversification of created prompts is improved, the correlation and relevance of created prompts to the specific objective of the method and apparatus are improved, and the number of images generated from the created prompts is increased.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions are generated according to the embodiments of the present disclosure. The computer may be a general-purpose computer, a computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, microwave, or the like) manner. The computer-readable storage medium may be any usable medium accessible by a computer, or a data storage device, a server or a data center, integrating one or more usable media. The usable medium may be a magnetic medium (for example, a floppy disk, a hard disk, a magnetic tape), an optical medium (for example, a DVD), a semiconductor medium (for example, a solid-state drive), or the like.

The foregoing descriptions are merely specific implementations of the present disclosure, but are not intended to limit the protection scope of the present disclosure. A person skilled in the art can make modifications/changes/substitutions to the foregoing embodiments without departing from the technical scheme of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

We claim:
1. A method for creating a prompt, comprising:
receiving properties of a prompt;

clustering the received properties into syntax elements;

diversifying, by a large language model (LLM), each of the clustered properties into a plurality of properties;

creating a prompt format database, wherein the creating of the prompt format database comprises:

creating prompt formats, evaluating the created prompt formats, wherein the evaluating of the created prompt formats comprises:

creating a set of sample prompts for each of the created prompt formats, evaluating the set of sample prompts for the created prompt formats on a correlation to a specific objective of the method, and evaluating, by a user and/or the LLM, each of the created prompt formats based on the evaluation results obtained from the evaluating of the set of sample prompts, and creating a prompt format database from the created prompt formats of which the evaluation result obtained from the evaluating of each of the created prompt formats is higher than a predefined evaluation threshold;

selecting a list of prompt formats in the created prompt format database; and creating prompts by inserting each of the diversified properties, obtained from the diversifying of each of the clustered properties, into each prompt format in the list of prompt formats in accordance with the syntax element of the corresponding clustered property of the diversified properties.

2. The method according to claim 1, wherein, in the receiving of the properties of the prompt, the properties are predefined properties, and/or inputted in a natural language by a user, and/or generated by a large language model (LLM) via predefined prompts.

3. The method according to claim 2, wherein the syntax elements in the clustering comprise a subject, a verb, and/or one or more other syntax elements.

4. The method according to claim 3, wherein, before the creating of the prompt formats, the method further comprises:

creating possible prompt properties:

from a natural language inputted by the user in accordance with a specific objective of the method, and/or from prompts which are generated by the LLM in accordance with the specific objective, and/or from properties which are generated by the LLM in accordance with the specific objective.

5. The method according to claim 4, wherein the creating of the prompt formats comprises creating prompt formats:

from the created possible prompt properties, and/or from prompts which are generated by the LLM in accordance with the specific objective, and/or from prompt formats generated by the LLM in accordance with the specific objective.

6. The method according to claim 5, wherein the creating of the set of sample prompts comprises:

generating prompts by the LLM in accordance with the specific objective, classifying the generated prompts into each of the created prompt formats obtained from the creating of the prompt formats, diversifying properties in each of the classified prompts to create a set of sample prompts for the corresponding prompt format.

7. The method according to claim 6, wherein the evaluating of the set of sample prompts comprises:

creating, by an image search engine and a text-to-image model, a set of images by using each sample prompt in the set of sample prompts of each of the created prompt formats, evaluating by comparing the sets of images of the created prompt formats of which sample prompts have the same properties for each of the common syntax elements based on the correlation to the specific objective, and evaluating all images in the sets of images, which are created from sample prompts having the same properties for each of the common syntax elements, based on the correlation to the specific objective, wherein the evaluating of each of the created prompt formats comprises evaluating each of the created prompt formats based on a combination of the evaluation results obtained from the evaluating by comparing the sets of images and the evaluating of all images; and wherein, in the creating of the prompt format database, the predefined evaluation threshold is a predefined evaluation threshold or set by the user.

8. The method according to claim 7, wherein the creating of the prompts further comprises:

if one of the diversified properties is syntax-clustered as the subject and the relevance of the said property to the specific objective is higher than a predefined threshold, then inserting the said property and other diversified properties into each prompt format in the list with the verb and/or one or more of the other syntax elements removed.

9. The method according to claim 8, wherein the diversifying of each of the clustered properties comprises diversifying each of the clustered properties in accordance with the specific objective, wherein the specific objective is a weapon detection, and/or a specific object detection.

10. The method according to claim 9, wherein the selecting of the list of prompt formats comprises:

adding all prompt formats in the prompt format database obtained from the creating of the prompt format database to the list, and removing duplicates of each prompt format from the list of prompt formats.

11. The method according to claim 10, after the diversifying of each of the clustered properties into the plurality of properties, the method further comprises filtering the diversified properties of one of the clustered properties based on a relevance of the diversified properties to each of the other clustered properties, the relevance is determined by the LLM;

wherein the creating of the prompts comprises:

creating prompts by inserting each of the filtered diversified properties obtained from the filtering of the diversified properties into each prompt format in the list of prompt formats in accordance with the syntax element of the corresponding clustered property of the filtered diversified properties, and if one of the filtered diversified properties is syntax-clustered as the subject and the relevance of the said property to the specific objective is higher than a predefined threshold, then inserting the said property and other filtered diversified properties into each prompt format in the list with the verb and/or one or more of the other syntax elements removed.

* * * * *